US011344807B2

(12) United States Patent
Schwarz et al.

(10) Patent No.: US 11,344,807 B2
(45) Date of Patent: May 31, 2022

(54) ELECTRONIC GAME MOMENT IDENTIFICATION

(71) Applicant: Lenovo (Singapore) Pte. Ltd., Singapore (SG)

(72) Inventors: David Alexander Schwarz, Morrisville, NC (US); John Weldon Nicholson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 48 days.

(21) Appl. No.: 16/534,581

(22) Filed: Aug. 7, 2019

(65) Prior Publication Data
US 2021/0038988 A1 Feb. 11, 2021

(51) Int. Cl.
| | | |
|---|---|---|
| *A63F 13/497* | (2014.01) | |
| *A63F 13/5375* | (2014.01) | |
| *A63F 13/424* | (2014.01) | |
| *A63F 13/95* | (2014.01) | |

(52) U.S. Cl.
CPC ........ *A63F 13/5375* (2014.09); *A63F 13/424* (2014.09); *A63F 13/497* (2014.09); *A63F 13/95* (2014.09); *A63F 2300/5533* (2013.01)

(58) Field of Classification Search
CPC .......................... A63F 13/497; A63F 2300/634
See application file for complete search history.

(56) References Cited

U.S. PATENT DOCUMENTS

| | | | | |
|---|---|---|---|---|
| 4,342,454 A | * | 8/1982 | Baer | A63F 13/10 463/31 |
| 6,231,443 B1 | * | 5/2001 | Asai | A63F 13/5252 463/32 |
| 6,699,127 B1 | * | 3/2004 | Lobb | A63F 13/10 463/43 |
| 7,717,789 B2 | * | 5/2010 | Shimizu | A63F 13/10 463/30 |
| 9,682,313 B2 | * | 6/2017 | Wilkiewicz | A63F 13/60 |
| 10,661,169 B1 | * | 5/2020 | Saucedo | A63F 13/497 |
| 11,040,286 B2 | * | 6/2021 | Reiche, III | A63F 13/67 |
| 2002/0123380 A1 | * | 9/2002 | Hirai | A63F 13/10 463/31 |
| 2004/0224741 A1 | * | 11/2004 | Jen | A63F 13/46 463/6 |
| 2007/0060389 A1 | * | 3/2007 | Shimizu | A63F 13/497 463/43 |
| 2009/0233713 A1 | * | 9/2009 | Tamura | A63F 13/67 463/36 |
| 2009/0312097 A1 | * | 12/2009 | Iwakiri | A63F 13/812 463/31 |
| 2014/0155174 A1 | * | 6/2014 | Laakkonen | A63F 13/46 463/42 |
| 2014/0228112 A1 | * | 8/2014 | Laakkonen | A63F 13/35 463/31 |

(Continued)

*Primary Examiner* — Steven J Hylinski
(74) *Attorney, Agent, or Firm* — Ference & Associates LLC

(57) ABSTRACT

One embodiment provides a method, including: receiving, at an information handling device, controlling input data, wherein the controlling input data is associated with action input provided by a user that affects an object in a video game; identifying, based at least in part on the controlling input data, a moment in the video game; and storing the identified moment in an accessible database. Other aspects are described and claimed.

16 Claims, 3 Drawing Sheets

(56) References Cited

U.S. PATENT DOCUMENTS

| | | | |
|---|---|---|---|
| 2015/0050997 A1* | 2/2015 | Suzman | A63F 13/63 463/31 |
| 2015/0224409 A1* | 8/2015 | Hayashida | A63F 13/497 463/31 |
| 2016/0067611 A1* | 3/2016 | Ware | A63F 13/67 463/29 |
| 2016/0067615 A1* | 3/2016 | Lai | A63F 13/30 463/23 |
| 2019/0091582 A1* | 3/2019 | Reiche, III | A63F 13/847 |
| 2019/0191218 A1* | 6/2019 | Cormican | H04N 21/4722 |
| 2020/0147499 A1* | 5/2020 | Mahlmeister | A63F 13/98 |

* cited by examiner

ELECTRONIC GAME MOMENT IDENTIFICATION

BACKGROUND

Individuals frequently utilize their information handling devices ("devices"), for example, smart phones or tablets, laptop and/or personal computers, other gaming devices (e.g., handheld, stationary, or hybrid video game consoles, etc.), and the like, to play a variety of different types of electronic games (i.e., "video games"). Generally, a user controls the actions of a virtual character or object in the video game by interacting with an input device integrally or operatively coupled to the device (e.g., a mouse and keyboard, a wired or wireless controller, a joystick, another type of input device, etc.).

BRIEF SUMMARY

In summary, one aspect provides a method, comprising: receiving, at an information handling device, controlling input data, wherein the controlling input data is associated with action input provided by a user that affects an object in a video game; identifying, based at least in part on the controlling input data, a moment in the video game; and storing the identified moment in an accessible database.

Another aspect provides an information handling device, comprising: a processor; a memory device that stores instructions executable by the processor to: receive controlling input data, wherein the controlling input data is associated with action input provided by a user that affects an object in a video game; identify, based at least in part on the controlling input data, a moment in the video game; and store the identified moment in an accessible database.

A further aspect provides a product, comprising: a storage device that stores code, the code being executable by a processor and comprising: code that receives controlling input data, wherein the controlling input data is associated with action input provided by a user that affects an object in a video game; code that identifies, based at least in part on the controlling input data, a moment in the video game; and code that stores the identified moment in accessible database.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
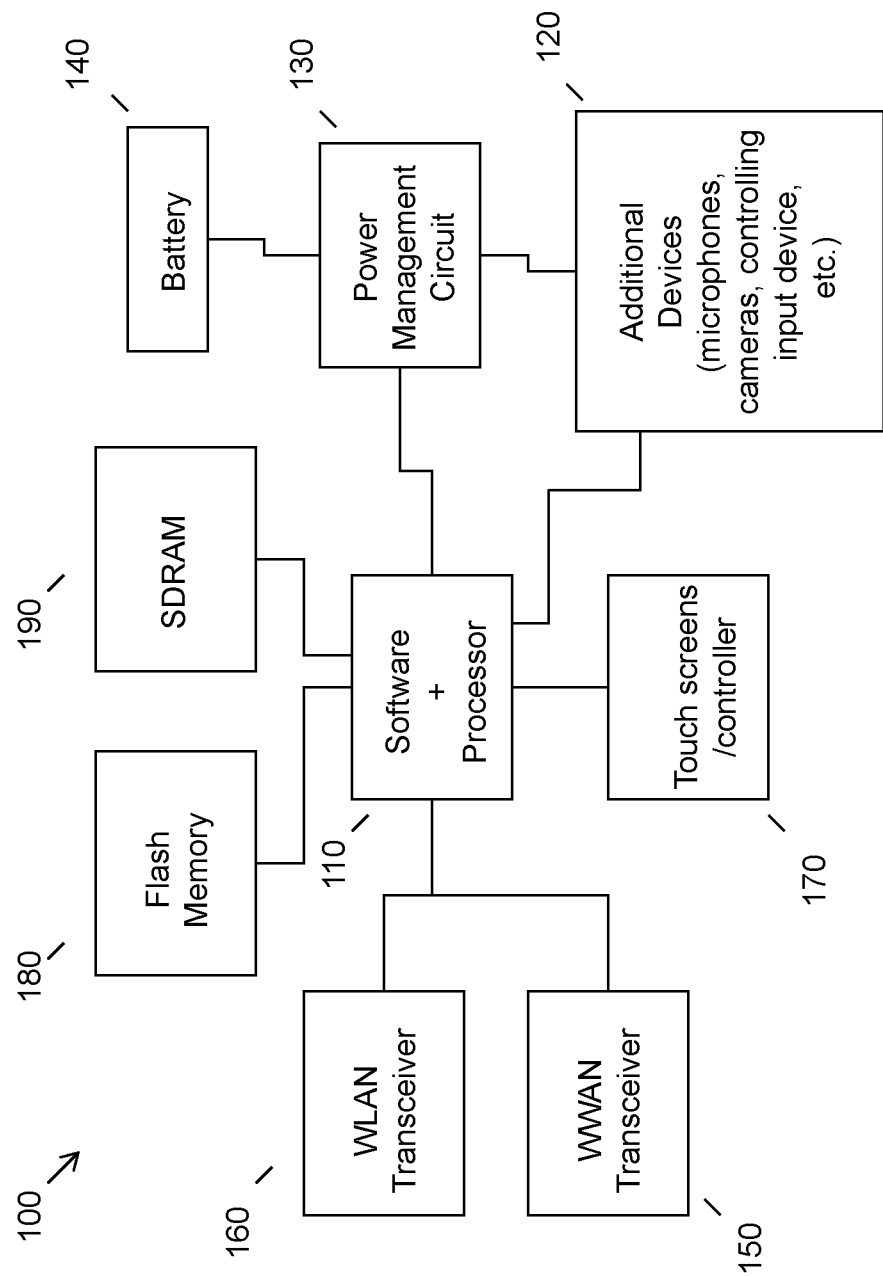
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Video games have become an increasingly important part of social culture. More particularly, there has been a rise in the number of video game players across all age groups and in both genders over the past two decades. One reason for this increase may be because, as technology has progressed, geographically diverse individuals are afforded the opportunity to play with one another through online gameplay. Another may be a result of the advent of live streaming platforms (e.g., TWITCH, YOUTUBE, etc.), which allow game players to record and share their experiences in games with other interested individuals. TWITCH is a registered trademark of Twitch Interactive, Inc. in the United States and other countries. YOUTUBE is a registered trademark of GOOGLE LLC in the United States and other countries.

Just as photographs and videos are used to capture and/or memorialize various real life events, certain in-game moments may hold similar value to a game player. More particularly, as an example, a player may want to review a moment in the game where they or their team performed very well. As another example, a player may want to review a moment in the game where a funny or an otherwise memorable event occurred. Although some players frequently record all, or a substantial amount, of their gameplay, the vast majority of players do not.

For the latter, conventional methods exist for automatically capturing various gameplay moments. More particularly, some games may present certain "highlight reel" moments that correspond to instances where a player, or a group of players, were involved in a notable event. For example, in the popular game, OVERWATCH, an approximate 10 second clip is played after the end of each game that showcases the maneuvers of a singular, player-controlled character during a match. However, this moment may only be relevant for a singular player (i.e., the player whose character is showcased). Additionally, the moment may not be a moment a player is interested in viewing. OVERWATCH is a registered trademark of Blizzard Entertainment, Inc. in the United States and other countries For the former, conventional media search and curation systems (e.g., GOOGLE photos, etc.) are not optimized to properly handle video game content. Stated differently, it is challenging for the aforementioned systems to organize recorded video game photos and videos into searchable content. Although new systems are being developed that have this capability, these systems are primarily focused on identifying and classifying moments based upon the visuals of the game and do not consider the controlling inputs provided by the players.

Accordingly, an embodiment provides a method for dynamically identifying and storing certain moments in a game based at least in part on a game player's controlling input data. In an embodiment, controlling input data may be received by or at a device. The controlling input data may refer to action input provided by a user that affects movement and function of an object in a video game (e.g., a video game character, etc.). An embodiment may then identify, based at least in part on this controlling input data, a moment in the video game. The moment may refer to a moment of highly skillful gameplay, a moment of poor gameplay, another type of notable moment, etc. In an embodiment, the identification may be conducted by only using the controlling input data or, alternatively, by fusing the controlling input data with one or more other available data forms (e.g., gameplay image data, voice input data, etc.). An embodiment may then store this moment in an accessible and searchable database for further downstream use. Such a method may better serve to identify, store, and curate memorable video game moments than conventional systems.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, controlling input device such as a mouse and keyboard, dedicated gaming controller or joystick, etc. System 100 often includes one or more touch screens 170 for data input and display/rendering. System 100 also typically includes various memory devices, for example flash memory 180 and SDRAM 190.

Figure 2:
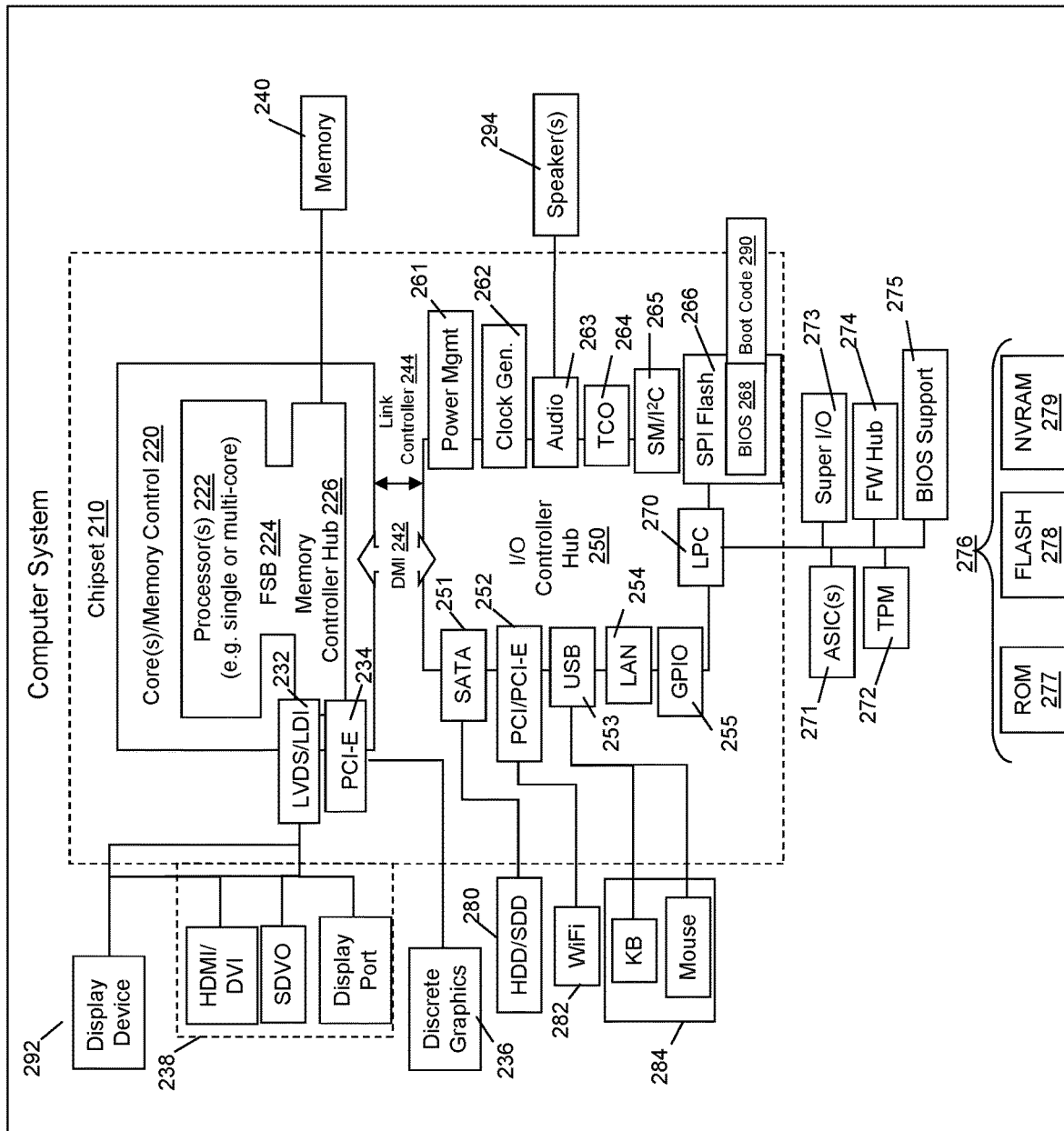
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of supporting a video game and a controlling input device. For example, the circuitry outlined in FIG. 1 may be implemented in a smart phone or tablet embodiment, whereas the circuitry outlined in FIG. 2 may be implemented in a laptop.

Figure 3:
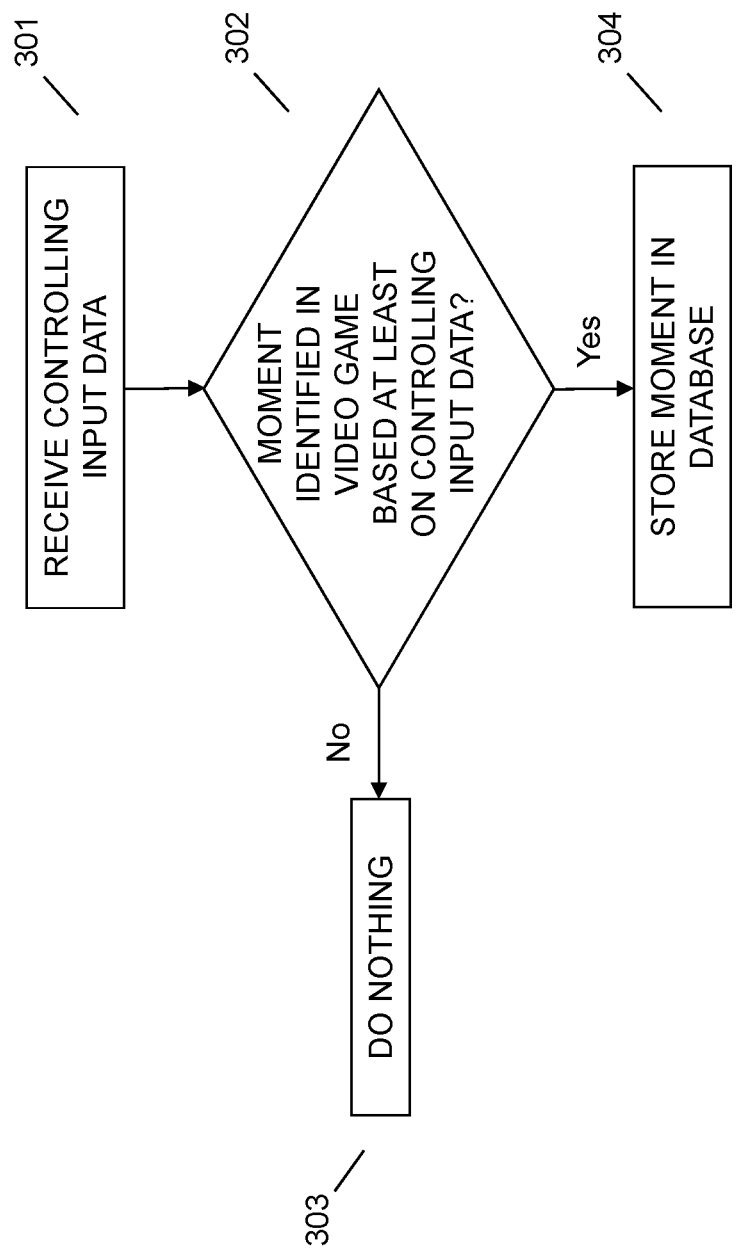
FIG. 3 illustrates an example method of identifying a moment-of-interest in an electronic game.

Referring now to FIG. 3, an embodiment may dynamically identify moments of interest to a user in a video game. At 301, an embodiment may receive controlling input data. In the context of this application, controlling input data may refer to user inputs provided to a controlling input device (e.g., mouse and keyboard, a wired or wireless controller, a joystick, etc.) during a video game. More particularly, the controlling inputs may affect the movements and/or functions of an object (e.g., a virtual character, etc.) in a video game.

In an embodiment, data associated with a user's controlling inputs may be recorded and stored for a predetermined period of time. For example, an embodiment may record all controlling input data provided during a game and thereafter store that data for a predetermined time after the game, or a round in the game, has ended (e.g., 12 hours, 24 hours, 1 week, etc.). Additionally or alternatively, an embodiment may continuously store the controlling input data until a storage space dedicated to storing controlling input data has been filled. At this point, an embodiment may delete the oldest stored controlling input data to make room for the newer controlling input data. Additionally or alternatively, an embodiment may only store the controlling input data determined to be associated with a memorable moment and thereafter discard the rest.

At 302, an embodiment may identify, based at least in part on the controlling input data, a moment of interest to a user in the video game. In the context of this application, a moment of interest ("moment") may refer to one or more memorable situations that occurred over the course of a game. For example, the moment may refer to a moment of highly skilled gameplay, a moment of poor gameplay, a funny moment or otherwise notable moment, etc.

In an embodiment, the identification may be conducted solely based upon the user's controlling input data. More particularly, an embodiment may identify the moment by analyzing a series of the user's controlling inputs and determining whether that series of controlling inputs correspond to a stored series of controlling inputs known to be associated with a predetermined moment. For example, an embodiment may identify that a user has performed a sequence of maneuvers that correlate to highly skilled gameplay by comparing their recorded controlling inputs to a database of controlling inputs associated with highly skilled gameplay for a situation in the game. If an embodiment identifies the user's controlling inputs share a predetermined level of similarity (e.g., 80% similarity, 90% similarity, etc.) with one or more controlling input references stored in the database, an embodiment may conclude that the user's controlling input sequence is associated with highly skilled gameplay.

In an embodiment, the identification may be conducted by utilizing additional data associated with other gameplay data types. For example, an embodiment may receive, in much the same way as the controlling input data is received, gameplay image data and/or voice input data. The gameplay image data may be associated with the visual output of the video game that appears on a display screen of the gaming device. The voice input data may be associated with audible inputs provided by a user to an audio capture device (e.g., a headset microphone, etc.). Examples of combination data type moment identification are described below.

In an embodiment, controlling input data and gameplay image data may be utilized to identify a moment. An embodiment may identify a contextual situation a user's character is in based upon the gameplay image data. An embodiment may further identify a user's actions in that contextual situation based upon the controlling input data. The combination of these two data metrics may thereafter be used by an embodiment to identify, for example, whether a user's video game choices in a particular situation were good or bad, humorous, etc. Regarding the former, good or bad moments may be identified irrespective of whether or not the user's controlling inputs produced some form of objective results (e.g., eliminated members of an enemy team, scored goals, etc.). For example, an embodiment may classify a series of user maneuvers as a bad moment even if those maneuvers produced positive, measurable results (e.g., if a user's maneuvers were conducted too early, too late, at an inappropriate time, etc.). Alternatively, a user's controlling inputs may be indicative of a good moment even though they did not necessarily produce measurable results that are reflected on a statistics sheet (e.g., the user's character was in the right place at the right time, etc.).

In an embodiment, controlling input data and voice input data may be utilized to identify a moment. An embodiment may identify a user's mood or emotions at a particular point in the game based upon the voice input data (e.g., by using one or more conventional voice analysis and/or mood categorizing techniques, etc.). An embodiment may further identify what a user did in the game while experiencing those emotions. For example, an embodiment may identify that a user jubilantly provided the voice input "Guys, look at this!" while simultaneously performing a particular controlling input maneuver (e.g., a maneuver triggering the user's character to perform a dance or another type of emotive action, etc.).

In an embodiment, a combination of all three of data types may be utilized to identify a moment. For example, using the example in the previous paragraph, an embodiment may identify that a user jubilantly provided the voice input "Guys, look at this!" while simultaneously performing a particular controlling input maneuver during a certain moment in the game (e.g., after the user's character has defeated an adversary, after the user's team won a match, etc.). An embodiment may be able to identify that any of the aforementioned combination input types correspond to a moment in much the same way as was previously described with respect to controlling inputs. More particularly, an embodiment may compare the combination of input types to a stored list of combination input types, where each combination input item in the list corresponds to a particular moment. If a match greater than a predetermined level of similarity is identified, then an embodiment may conclude that the combination input types correspond to a moment that a user may want to remember.

Responsive to not identifying, at 302, a moment in the video game, an embodiment may, at 303, take no additional action. Conversely, responsive to identifying, at 302, a moment in the video game, an embodiment may, at 304, store the moment in an accessible database (e.g., stored locally on the device, stored remotely on another device or server, etc.).

In an embodiment, one or more identified moments may be dynamically presented to the user after a predetermined event (e.g., a game-over event, a life-loss event, a user request event, etc.). For example, an embodiment may present the identified moment(s) at the conclusion of a particular match. As another example, an embodiment may present the identified moment(s) after a user has lost a virtual life. An embodiment select the moment(s) to be presented based upon predefined settings. For example, an embodiment may be instructed to present the moment associated with the highest level of skilled gameplay. In another example, an embodiment may be instructed to present all of the humorous moments that occurred during a particular match.

In an embodiment, the identified moments may be utilized as a learning tool for the user. For example, a user may review all of the moments in the game that were classified as bad in attempt to improve their subsequent gameplay. Additionally or alternatively, an embodiment may provide the user with suggestions to improve their gameplay based upon analysis of the bad gameplay moment. For example, an embodiment may identify what a user should have done during a particular, in-game contextual event versus what the user actually did. An embodiment may thereafter provide one or more suggestions on how the user may alter their input sequence the next time they encounter a similar, in-game situation.

In an embodiment, each identified moment may be tagged with metadata (e.g., day/date the moment occurred, in which video game the moment occurred, the identity of the virtual character that was being controlled by the user when the moment occurred, etc.). An embodiment may then organize and group the moments based on these tags. Accordingly, in much the same way that conventional media storage and curation systems operate, the moments may be organized and made searchable by the context associated with them, without any explicit using tagging. For example, a user may be able to simply provide the search input "high skilled gameplay" and an embodiment may present them with all of the moments associated with this moment. As another example, a user may be able to type in the name of a particular character that they controlled and an embodiment may present them with all of the moments that included that character.

The various embodiments described herein thus represent a technical improvement to conventional methods of identifying notable moments in video games. Using the techniques described herein, an embodiment may receive controlling input data or, alternatively, may receive additional data such as gameplay video data and/or voice input data. Based on the foregoing video game data metrics, an embodiment may identify one or more notable moments that occurred during the course of a video game. An embodiment may thereafter store these moments in an accessible data. Additionally or alternatively, an embodiment may present these moments to the user after a predetermined event. Such a method may provide the user with richer and more relevant game moments than they may have received from other conventional systems and processes.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, controlling input data that affects movement of a virtual character in a video game;
receiving, at the information handling device, gameplay video data corresponding to action occurring in the video game around the virtual character;
identifying, from the gameplay video data, a contextual situation that the virtual character is in;
identifying, based on the controlling input data, a moment in the video game, wherein the identifying the moment comprises:
analyzing, using a processor, a series of controlling inputs from the controlling input data in view of the contextual situation; and
determining that the series of the controlling inputs in view of the contextual situation are associated with a high-skilled maneuver irrespective of whether the series of controlling inputs produced an objective in-game statistical result; and
storing the identified moment in an accessible database.

2. The method of claim 1, further comprising:
receiving gameplay image data and voice input data;
wherein the identifying comprises identifying the moment using at least one of the gameplay image data and the voice input data in combination with the controlling input data.

3. The method of claim 2, wherein the identifying comprises:
comparing the combination of data to a list of predefined combination data, wherein each item of predefined combination data corresponds to a unique moment; and
determining whether the combination corresponds to a unique moment embodied in the list.

4. The method of claim 1, wherein the moment is associated with a sentimental gaming moment.

5. The method of claim 1, wherein the storing comprises:
recording all of the controlling input data during a predetermined time period of the video game; and
deleting the controlling input data not associated with the moment.

6. The method of claim 1, further comprising providing a gaming-related suggestion to the user based on the moment.

7. The method of claim 1, further comprising presenting the moment to the user after a predetermined event.

8. The method of claim 7, wherein the predetermined event is an event selected from the group consisting of: a game-over event, a user request event, and a user life-loss event.

9. An information handling device, comprising:
a processor;
a memory device that stores instructions that, when executed by the processor, cause the information handling device to:
receive controlling input data that affects movement of a virtual character in a video game;
receive, at the information handling device, gameplay video data corresponding to action occurring in the video game around the virtual character;
identify, from the gameplay video data, a contextual situation that the virtual character is in;
identify, based on the controlling input data, a moment in the video game, wherein the identifying the moment comprises:
analyzing, using a processor, a series of controlling inputs from the controlling input data in view of the contextual situation; and
determining that the series of the controlling inputs in view of the contextual situation are associated with a high-skilled maneuver irrespective of whether the series of controlling inputs produced an objective in-game statistical result; and
store the identified moment in an accessible database.

10. The information handling device of claim 9, wherein the instructions are further executable by the processor to:
receive gameplay image data and voice input data;
wherein the instructions executable by the processor to identify comprise instructions executable by the processor to identify the moment using at least one of the gameplay image data and the voice input data in combination with the controlling input data.

11. The information handling device of claim 10, wherein the instructions executable by the processor to identify comprise instructions executable by the processor to:
compare the combination of data to a list of predefined combination data, wherein each item of predefined combination data corresponds to a unique moment; and
determine whether the combination corresponds to a unique moment embodied in the list.

12. The information handling device of claim 9, wherein the moment is associated with a sentimental gaming moment.

13. The information handling device of claim 9, wherein the instructions executable by the processor to store comprise instructions executable by the processor to:
record all of the controlling input data during a predetermined time period of the video game; and
delete the controlling input data not associated with the moment.

14. The information handling device of claim 9, wherein the instructions are further executable by the processor to provide a gaming-related suggestion to the user based on the moment.

15. The information handling device of claim 9, wherein the instructions are further executable by the processor to present the moment to the user after a predetermined event.

16. A product, comprising:
a computer-readable storage device that stores executable code that, when executed by a processor, causes the product to:
receive controlling input data that affects movement of a virtual character in a video game;
receive gameplay video data corresponding to action occurring in the video game around the virtual character;
identify, from the gameplay video data, a contextual situation that the virtual character is in;
identify, based on the controlling input data, a moment in the video game, wherein the identifying the moment comprises:
analyzing a series of controlling inputs from the controlling input data in view of the contextual situation; and
determining that the series of the controlling inputs in view of the contextual situation are associated with a high-skilled maneuver irrespective of whether the series of controlling inputs produced an objective in-game statistical result; and
store the identified moment in accessible database.

* * * * *